United States Patent Office 3,819,746
Patented June 25, 1974

3,819,746
CATALYSIS OF OXIRANE-IMIDE SYSTEMS
Arthur Katzakian, Jr., Sacramento, and Roger B. Steele, Fair Oaks, Calif., assignors to Aerojet-General Corporation, El Monte, Calif.
No Drawing. Filed Jan. 14, 1972, Ser. No. 218,015
Int. Cl. C08g 45/00
U.S. Cl. 260—830 TW          8 Claims

ABSTRACT OF THE DISCLOSURE

This patent describes a novel storable epoxy-imide resin precursor comprising a curable oxirane monomer and an imide, the improvement wherein the system is provided with an activated chromium III tricarboxylate salt catalyst which contains available coordination sites, and which sites are rendered unavailable in the presence of certain non-reactive, removable electron donating solvents. That is to say, the catalyst compound, in the presence of particular solvents is rendered noncatalytic; on the removal of said solvents, catalytic activity is restored. These solvents include but are not limited to such polar electron coordinating solvents as removable methanol, ethanol, N,N-dimethyl formamide, dioxane, tetrahydrofuran, dimethyl sulfoxide, dimethyl sulfolane, nitro alkanes, nitro aromatics, tetramethyl urea, N,N-dimethylacetamide, N-methylcaprolactam and N-methyl pyrrolidone. Upon the removal of only the solvent as by evaporation, the activity of the catalyst is restored, by the formation of unoccupied coordination sites, whereby the reaction of the oxirane compound with the imide can take place.

BACKGROUND OF THE INVENTION

Various types of epoxy coatings, adhesives, and elastomer formulations have been proposed. For the most part, these systems require the addition of the catalyst, or the curing agent or both to the epoxy monomer just prior to use since earlier addition would result in the premature curing to a polymerizate. For the most part, the known epoxy compounds are not storage stable in the presence of catalysts alone or in combination with curing agents. It is this factor which necessitates the common use of the two component system. A major disadvantage of the two component system is the necessity for double packaging and the attendant inconvenience and errors associated with blending the two packages just prior to use. Therefore, there has been a long felt need in the art for a storage stable one package oxirane based system. The present invention fulfills this need. This invention makes possible the preparation of oxirane-imide monomer storable systems for paints, coatings and adhesives as well as laminating resins, potting compounds and elastomer formulations to be prepared as a single package.

Chromium salts are known in which the oxidation state of chromium varies between one and six. Extensive investigation has shown, however, that chromium III is the most stable and important oxidation state of the element. An important characteristic of the chromium III ion is that it has six coordination sites arranged in an octahedral configuration about the central ion. The coordination sites of chromium III account for the existence of stable complex ions such as the hexaaquochromium ion $$Cr(H_2O)_6^{+++}$$

and the hexaminochromium ion $Cr(NH_3)_6^{+++}$. In both of the above examples the water and ammonia, commonly called ligands (L), occupy the six coordination sites of chromium III and are arranged in an octahedral configuration about the central chromium III ion.

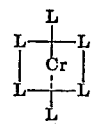

Ligands may be electrically neutral, as in the cases of water and ammonia, or negatively charged as in the case of the cyanide ion which gives rise to the negatively charged hexacyanochromium ion $Cr(CN)_6^{-3}$.

Further, chelating agents, such as the acetylacetonate anion, form exceedingly stable chromium chelates in which all of the chromium III coordination sites are occupied.

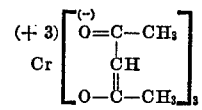

The removal of ligands from the chromium III ion or the displacement of the ligands by other ligands is an extremely difficult and slow process. It is largely because of this kinetic inertness that so many complex chromium III species can be isolated and that they persist for relatively long periods of time in solution, even under conditions where they are thermodynamically quite unstable. It is known in the literature that the normally occurring form of $Cr^{+++}$ tends toward the fully coordinated state. The kinetic stability of $Cr^{+++}$ in widely found complex coordination compounds sets the chromium III ion apart from most other trivalent transition metal ions. We have found that the commonly occurring fully coordinated chromium III carboxylates are poor catalysts for the imide-oxirane reaction. Quite surprisingly, however, we have found that Chromium III having uncoordinated sites is a superior catalyst for such reactions.

SUMMARY OF THE INVENTION

Briefly, the present invention comprises a novel storable epoxy system comprising a curable oxirane, monomer and an imide monomer, the improvement wherein the reactant mixture is provided with a chromium III carboxylate catalyst in deactivated form and a non-reactive, volatilizable coordinating, electron donating solvent, which solvent upon removal reactivates the catalyst by providing available unoccupied coordination sites whereby said activated catalyst is rendered capable of promoting the desired reaction between the oxirane and imide monomers.

The solvents include but are not limited to such polar election coordinating solvents as methanol, ethanol, N, N-dimethyl formamide, dioxane, tetrahydrofuran, dimethyl sulfoxide, dimethyl sulfolane, nitroethane, nitrotoluene, nitrobenzene, tetramethyl urea, N, N-dimethylacetamide, N-methylcaprolactam and N-methyl pyrrolidone.

It is an object of the present invention to provide a novel storable epoxy polymerization system.

Another object of the present invention is to provide a polymerization system of two components capable of being stored as a single package curable epoxy system, prior to reaction.

Still another object is to provide a means for increasing the pot life of an epoxy based polymerizational system.

Yet another object is to provide a means for low temperature short time duration polymerization reaction of oxiranes with imides.

A further object of the present invention is to provide a novel method for the storage of curable epoxy resin forming systems for prolonged periods without curing.

These and other objects and advantages of this invention will be apparent from the more detailed description which follows.

DESCRIPTION OF PREFERRED EMBODIMENTS

Previously we have maintained the fact that the chromium III compounds which are to be utilized herein should contain unoccupied coordination sites. While the preferred compounds are those tricarboxylate salts which have three of the six coordination sites unoccupied, it is seen that those tricarboxylate compounds with less than three unoccupied sites, but at least one such site, do exhibit some catalytic activity. Compounds with less than all of the coordination sites unoccupied may exist as a statistical average of some number greater than the zero but less than three, as well as those with an integral amount of sites available. Preparation of compounds which have an exact number, i.e., two or one, of available sites, while more difficult than the preparation of the compounds with a statistical number of unoccupied sites, can be achieved.

In order to produce and maintain a catalytically active chromium III compound, special precautions must be taken (a) during its preparation, (b) with respect to the type of anion used to form the desired electronically neutral catalyst.

In general, the chromium III tricarboxylate salts may be prepared by the reaction of an aquated inorganic chromium III salt such as aquated chromium nitrate with three moles of alkali carboxylate.

(A)

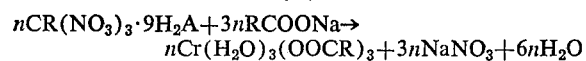

$n$ = the number of moles utilized.

The chromium III salt obtained by this method is catalytically inactive since the six chromium III coordination sites are occupied by the water. In order to produce the active catalyst, the aquated form must be subjected to a high temperature, acid catalyzed process in which the coordination sites are freed of water.

(B)

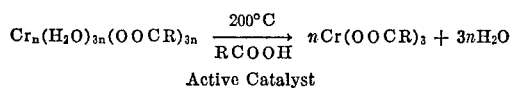

Active Catalyst

In the above equations, R is a monovalent organic radical such as alkyl, aryl, alkaryl or aralkyl, and preferably contains from 1 to about 20 carbon atoms. Alternatively a salt such as Hydrated $K_2Cr_2O_7$ from the marketplace, may be treated with a carboxylic acid in the presence of an alcohol, i.e., an oxidation-reduction reaction to prepare a chromium +3 compound which is then treated to remove the associated water as above.

The anion (negatively charged) portion of the catalyst is also critical to its activity in the sense that it might cause complete coordination. For example, if the carboxylate anion utilized is replaced instead by the acetylacetonate anion the resulting chromium III acetylacetonate is catalytically inactive under our test conditions. The reason for this is that the acetylacetonate groups effectively occupy all of the chromium III coordination sites.

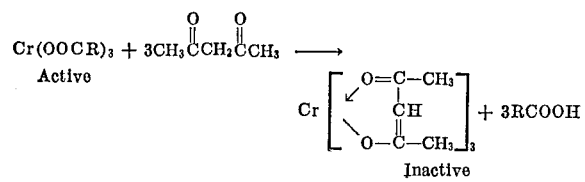

The amount of heat applied in reaction (B) will influence the number of coordination sites rendered free. Visual color changes will be seen as the products change generally from a violet to a green color during dehydration. It is seen that this technique will prepare catalytically active compounds containing varying amounts of residual water of hydration. The preferred compounds, i.e., those which are dry are also prepared in such a manner. The fact that all of the associated water has been removed from all of the chromium molecules is evidenced by the fact that the water absorption peak in the near infra-red spectrum is absent. By following the water absorption peak in the near infrared spectrum, it is seen that as this decreases, the statistical average of available coordination sites increases proportionally for the chromium compound.

Chromium catalysts utilizable in this invention which have a precise amount of water of hydration can be produced in several ways. One such theorized manner is to oxidize a chromous salt of an alkyl dione anion, which compound would be known to have four occupied coordination sites, to the chromic state, which compound would have five occupied sites, the bridging oxygen taking up the fifth site leaving the sixth site on the chromic salt open.

The preferred chromium III tricarboxylate salts are those in which three of the six coordination sites on chromium III are unoccupied and are thus available to participate in catalysis. Here, three chromium III coordination sites are occupied by the carboxylate anions to produce a neutral molecule; the remaining three sites being unoccupied. The R side chain group of the carboxylate anions may be adjusted in order to effect the solubility in various reaction media necessary for efficient catalysis. The structure of a typical chromium III tricarboxylate salt possessing three unoccupied coordination sites may be envisioned as follows:

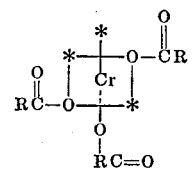

* = Available coordination sites.

Such salts having open coordination sites have been found to be powerful catalysts which promote the rapid stoichiometric reaction between oxirane and imide monomers without the addition of heat to yield the corresponding 2-hydroxyalkyl imides.

Exemplary

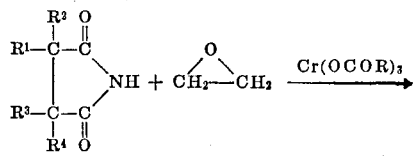

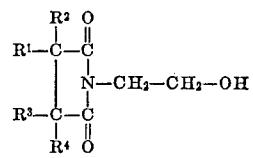

Wherein any of $R^1$, $R^2$, $R^3$, and $R^4$ are H, or wherein each R is H, or a $C_1$ to $C_{18}$ linear, or branched saturated or unsaturated hydrocarbon group, which may be unsubstituted or substituted in a non-interfering manner.

The solvent deactivator for the catalyst can be added to the active form of the catalyst, said active form being the catalyst chromium carboxylate which contains unoccupied coordination sites, at any of several instances to deactivate the catalytic activity. It can be added to the catalyst compound along following its preparation and prior to the mixture with either of the reactants; it can be mixed with one of the two reactants or both of the oxirane and the imide components prior to the addition of the chromium salt. Any and all modes of addition are contemplated such that the chromium is deactivated and is prevented from catalyzing the reaction until such time as is desired that the reaction take place.

In the practice of the invention, the active form of the catalyst is added alone or in combination with one or both of the reactants into the deactivating solvent. Care need not be taken however, to avoid the possibility of having the activated catalyst in combination with the oxirane compound as homopolymerization of epoxy will not proceed. Thus the chromium salt may be added to the oxirane with subsequent addition of the de-activating solvent.

While not bound by any theory, it is believed that the catalysis of the imide-epoxy reaction by $Cr(OCOR)_3$ is based on the transient occupation of the available chromium III coordination sites by at least one of the reactants. This unique energetic specie that is formed provides the means for the rapid reaction of one component with the other. The catalyst is regenerated during the course of each reaction and thus is able to participate in further reactions.

Chromium III tricarboxylate salts must fulfill three prerequisites for effective catalysis of the acid-imide reaction: (a) Solubility in the reaction media, (b) possession of coordination sites available for catalysis utility and (c) the capability of forming kinetically stable coordination complexes, so that reactant residence times on the chromium III ion are sufficient to permit reaction to occur.

It should be pointed out, that as to factor (a), namely solubility, that it would be possible to use a deactivating solvent for the inhibition of the catalytic activity as the sole medium for the reaction of the imide and the oxirane, and then drive off enough to of the solvent to activate the catalyst and initiate reaction, and it would also be possible to add solvent #1 deactivated catalyst to a mixture of the reactants situated in a second solvent. Here, the second solvent would have to be a non-electron donating one, and the two solvents would have to be capable of having the deactivator separable from the reaction medium.

In the practice of the invention, the chromium III tricarboxylate salt is simply mixed in an effective catalytic amount, of from about 0.1 to about 10% by weight of the system with the oxirane monomer and the imide. Since the trivalent chromium III of the catalyst governs, at least to some extent, the amount of catalyst required in a given time, the weight amount of the lower molecular weight catalysts used is generally less than is required when the high molecular weight compounds are employed.

This invention comprehends a stoichiometric combination of imide and oxirane, both having a functionality of at least one, or more, with a catalytic amount of active chromicsalt all combined in a solvent capable of coordinating the chromium III salt. The fully coordinated chromium III has no catalytic activity in this environment. Catalytic activity occurs, however, after the solvent has been removed, without removing the chrome salt from the system as for instance by volatilization, but not by decantation. The chromium III then becomes wholly or partially uncoordinated in which state it is highly catalytic toward this reaction. A wide variety of solvents provide deactivation of these catalysts to varying degrees. Generally these are derived from the class called electron donating solvents. By way of example only, the following illustrate this class: N,N-dimethyl formamide, tetrahydrofuran, methanol, ethanol, dioxane, dimethyl sulfoxide, dimethyl sulfolane, tetramethyl urea, N,N-dimethylacetamide, N-methylcaprolactam and N-methyl pyrrolidone, nitro alkanes such as nitro-ethane, and nitro-aromatic compounds such as nitrotoluene, and nitrobenzene.

The advantages of the present invention have been found to be obtained using any soluble trivalent chromium III tricarboxylate salt containing unoccupied coordination sites, which are capable of reversible coordination by the solvents discussed above. Typical of such compounds are trivalent chromium hexanoate, trivalent chromium pentanoate, trivalent chromium butyrate, trivalent chromium 2-ethyl-hexanoate, trivalent chromium decanoate, trivalent chromium oleate, trivalent chromium 2-octanoate, trivalent chromium toluate, trivalent chromium cresylate, trivalent chromium benzoate, trivalent chromium alkylbenzoates, trivalent chromium alkoxybenzoates, trivalent chromium naphthanates and trivalent chromium alkoxide. Generally, although not necessarily, the dehydrated trivalent chromium catalysts of our invention contain in toto from about 6 to about 60 carbon atoms. We have found that these catalysts are at least somewhat soluble in the reaction system. This solubility is essential to the effectiveness of the catalyst. However, the exact degree of solubility is not critical.

The epoxide-containing compositions which can be reacted with imides using our novel catalyst comprise organic materials having reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

The oxiranes which may be used in the practice of this invention include any of those materials familiar to those skilled in the art. Typical epoxy components suitable in the practice of the present invention are those disclosed in United States Pats. No. 2,500,600 and 2,324,483, the disclosures of which are expressly incorporated herein by reference.

As 1:2-epoxy compounds to be used in the present invention there may be used monoepoxides, such as butylglycide, phenylglycide, cresylglycide, 3:4-epoxy-tetra-hydrodicyclopentadienol-8, 3:4-epoxy-hexahydrobenzal glycerol or 3:4-epoxy-cyclohexane-1:1-dimethanol-acrolein acetal. Preferred use is made of 1:2-epoxy compounds having an epoxide equivalence greater than 1, that is to say compounds containing $x$ groups of the formula

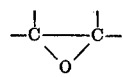

calculated from the average molecular weight, where $x$ is a whole or fractional number greater than 1.

The 1:2-epoxide groups may be either terminal or inner ones. Particularly suitable terminal 1:2-epoxide groups are 1:2-epoxyethyl or 1:2-epoxypropyl groups; the latter may be linked to an oxygen atom, that is to say they are glycidylether or glycidylester groups. Compounds with inner epoxide groups contain at least one 1:2-epoxide group in an aliphatic chain

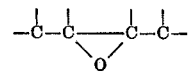

or in a cycloaliphatic ring.

As epoxy compounds containing an inner 1:2-epoxide group there are suitable epoxidised diolefines, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized, diolefinicallyunsaturated carboxylic acid esters, such as methyl-9:10:12:13-diepoxystearate; or the dimethyl ester of 6:7:10:11-diepoxyhexadecane-1:16-dicarboxylic acid. Furthermore, there may be mentioned epoxidized mono-, di or poly-ethers, mono-, di- or poly-esters, mono-, di- or poly-acetals containing at least one cycloaliphatic 5-membered or 6-membered ring, to which at least one 1:2-epoxide group is linked. Suitable compounds of this kind are those of the following formulae

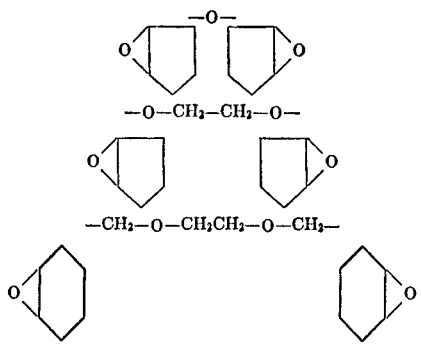

A widely used class of polyepoxides which can be catalyzed in reaction with imides according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

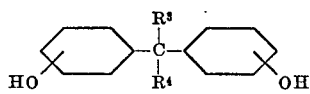

wherein the phenolic hydroxy groups may be in one of the 2,2'; 2,3'; 2,4'; 3,3'; 3,4'; or 4,4' positions on the aromatic nuclei, and each of $R^3$ and $R^4$ represent hydrogen, an alkyl group, such as methyl, ethyl, propyl, isopropyl, butyl, sec-buty, tert.-butyl, pentyl, isopentyl, hexyl, isohexyl, and the like; a cyclo (lower)-alkyl group, such as a cyclohexyl or substituted cyclohexyl group, e.g., methyl-, ethyl-, propyl-, butyl-, pentyl- and hexyl-substituted cyclohyxyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, secbutyl and tert.-butyl groups, halogen atoms, i.e., fluorine, chlorine, bromine or iodine, and the like.

An illustrative listing of dihydric phenols falling within this general formula includes 4,4'-dihydroxydiphenylidimethylmethane (bisphenol A),
2,4'-dihydroxydiphenylethylmethane,
3,3'-dihydroxydiphenyldiethylmethane,
3,4'-dihydroxydiphenylmethylpropylmethane,
2,3'-dihydroxydiphenylethylphenylmethane,
4,4'-dihydroxydiphenylpropylphenylmethane,
4,4'-dihydroxydiphenylbutylphenylmethane,
2,2'-dihydroxydiphenylditolylmethane,
4,4'-dihydroxydiphenyltolylmethylmethane, and the like.

Other polyhydric phenols which may also be coreacted with an epihalohydrin to provide these resinous epoxy polyethers are such compounds as resorcinol, hydroquinone substituted hydroquinones, and polyhydric phenols having two hydroxylaryl groups separated by an aliphatic chain of at least six carbon atoms in length, said chain being attached by carbon-to-carbon bonding to nuclear carbon atoms of the hydroxylaryl groups. Members of this latter class of polyhydric phenols can be conveniently obtained by condensing phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

Among the polyhydric alcohols which can be coreacted with an epihalohydrin to provide these resinous epoxy polyethers are such compounds as ethylene glycol, propylene glycols, butylene glycols, pentane diols, bis (4-hydroxycyclohexy) diamethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2',2', 3,3'-tetrahydroxydipropyl sulfide and the like, mercapto alcohols such as a-monothioglycerol, a,a'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

The resulting resinous reaction products may contain free terminal hydroxyl groups or terminal hydroxyl groups and terminal epoxy groups, and will vary in molecular weight depending on the reactants employed, the relative amounts thereof, and the extent to which the reaction is carried out.

A related class of polymeric polyepoxides comprises the polyepoxypolyhydroxy polyethers obtained by reacting, again preferably in alkaline medium a polyhydric phenol such as bisphenol A, resorcinol, catechol and the like, or a polyhydric alcohol such as glycerol, sorbitol, pentaerythritol and the like, with polyepoxide such as bis(2,3-epoxypropyl)ether, bis(2,3-epoxy-2-methylpropyl) ether, 1,2-epoxy-4,5-epoxypentane and the like.

Another class of polymeric polyepoxides utilizable herein, includes the epoxy novolac resins obtained by reacting, preferably in the presence of a basic catalyst, e.g. sodium or potassium hydroxide, and epihalohydrin such as epichlorohydrin with the resinous condensate of an aldehyde, e.g., formaldehyde, and either a monohydric phenol e.g., phenol itself, or a polyhydric phenol, e.g., bisphenol A.

Still another class of polymeric polyepoxides includes polymers, i.e. homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3 - epoxypropyl crotonate, vinyl cyclohexane monoxide, 4-glycidyloxystyrene, and the like.

Among the monomeric polyepoxides which can be reacted with imides as per the present invention are the di- and triepoxides represented by the general formula

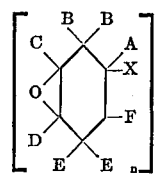

wherein A through F represent hydrogen or an alkyl group preferably a lower alkyl group having from 1 to 4 carbon atoms, inclusive, such as methyl, ethyl, propyl, n-butyl and the like, and X represents a divalent radical which can be:

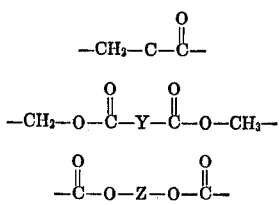

in which case $n$ equals 2, or a trivalent radical which can be

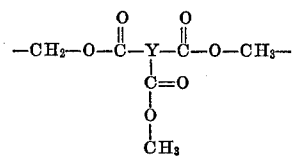

or

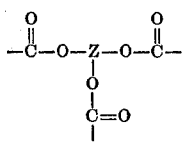

in which case $n$ equals 3, with V representing an aliphatic or aromatic hydrocarbon radical containing from 2 to 12 carbon atoms, inclusive, and Z representing a lower aliphatic hydrocarbon radical or a lower oxyalkylene group, e.g., alkylene-O-alkylene- and the like. Included among such di- and tri-epoxides are 3,4-epoxycyclohexylmethyl,
3,4-epoxy-cyclohexanecarboxylate,
3,4-epoxy-6-methylcyclohexylmethyl,
3,4-epoxy-6-methylcyclohexanecarboxylate,
bis(3,4-epoxycyclohexylmethyl) maleate,
bis(3,4-epoxy-6-methylcyclohexylmethyl)-succinate,
ethylene glycol bis(3,4-epoxycyclohexanecarboxylate),
2-ethyl-1,3-hexanediol bis(3,4-epoxy-6-methylcyclohexanecarboxylate),
tris(3,4-epoxycyclohexylmethyl) 1,2,4-hexanetricarboxylate,
glyceryl tris(3,4-epoxy-6-methylcyclohexanecarboxylate) and the like.

Other monomeric polyepoxides which can be used include dicyclopentadiene dioxide, epoxidized triglycerides such as epoxidized glycerol trioleate, epoxidized glycerol trilinoleate, the diacetate of epoxidized glycerol trilinoleate and the like.

1,8-bis-(2,3-epoxypropoxy) octane,
1,4-bis(2,3-epoxypropoxy) cyclohexane,
1,4-bis(3,4-epoxybutoxy)-2-chlorocyclohexane,
1,3-bis(2,3-epoxypropoxy) benzene,
1,4-bis(2,3-epoxypropoxy) benzene,
1,3-bis(2-hydroxy-3,4-epoxybutoxy)benzene,
1,4-bis(2-hydroxy-4,5-epoxypentoxy)benzene,
1,3-bis(4,5-epoxypentoxy)-5-chlorobenzene,
4,4'-bis(2,3-epoxypropoxy) diphenyl ether, and epoxy esters of polybasic acids such as diglycidyl succinate, diglycidyl adipate, diglycidyl maleate, diglycidyl phthalate, diglycidyl hexachloroendomethylenetetrahydrophthalate and diglycidyl 4,4' - isopropylidenedibenzoate, and the like.

Furthermore, there are suitable polyglycidylesters accessible by reacting a dicarboxylic acid with epichlorohydrin or dichlorohydrin in the presence of an alkali; such polyesters may be derived from aliphatic dicarboxylic acids, such as oxalic, succinic, glutaric, adipic, pimelic, suberic, azelaic, sebacic acid, or more especially from aromatic dicarboxylic acids, such as phthalic, isophthalic, diphenylortho; ortho'-dicarboxylic acid, ethyleneglycolbis-(paracarboxyphenyl)-ether or the like. As examples there may be mentioned diglycidyl adipate and diglycidyl phthalate.

Many of these polyepoxides, and particularly those which are polymeric can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

Flame-inhibiting properties in the final product may be achieved by using 1:2-epoxy compounds that additionally contain halogen, more especially chlorine or bromine. The following examples of such halogen-containing epoxy compounds may be mentioned:

Diglycidylethers of chlorinated bisphenols, 2:3-dichloro-1:4 butanediol diglycidylether, 2:3-dibromo-1:4-butanediol diglycidyl ether, 2:2. 3:3-tetrachloro-1:4-butanediol diglycidylether.

All mono and polyfunctional primary imides, reported in the literature, as well as any others that are primary imides which would be derived from carboxylic acid anhydrides are contemplated for use herein.

These materials can be monomeric or polymeric, saturated or unsaturated, aliphatic, cycloaliphatic, aromatic or heterocyclic, and they may be substituted if desired with other substituents, e.g. hydroxyl groups, ether radicals, halogen atoms, and the like.

Typical among the cyclic anhydrides that can be converted to imide compounds are the following monoanhydrides; phthalic anhydride, methylendomethylene tetrahydrophthalic anhydride, succinic anhydride, dodecenylsuccinic anhydride, maleic anhydride, hexahydrophthalic anhydride, hexachloro-endomethylene tetra-hydrophthalic anhydride, endomethylene tetrahydrophthalic anhydride or mixtures thereof.

The process for accomplishing same is readily known to those participating in this art.

Other well known anhydrides that are convertible to imides are the polyfunctional cyclic anhydrides. Among these, mention may be made of pyromellitic tetracarboxylic acid dianhydride, benzophenone tetracarboxylic acid dianhydride, cyclopentane tetracarboxylic acid dianhydride, diphenylether tetracarboxylic acid dianhydride, and the hexacarboxylic acid trianhydrides of benzene, and of cyclohexane.

Another class of imides utilizable are the linear mono and di functional primary imides prepared for instance by the reaction of acid halides such as acetyl chloride, dimer acid chloride, formyl bromide, adipyl chloride, benzyl iodide, sebacicyl dichloride, terephthaloyl chloride and the like with primary amides such as formamide, acetamide, benzamide, tolylamide, adipic acid diamide, and all other amides formed from mono and polyfunctional carboxylic acids, saturated and unsaturated, and which may contain other non-interfering substituents thereupon. Primary amides of fatty acids can also be converted to imides in this manner. Typical of such fatty acids which can be converted to imides are stearic, caprylic, linoleic, palmitic, and oleic and the like.

Another class of imides utilizable herein are those prepared from unsaturated cyclic or linear anhydrides such as maleic anhydrides and substituted maleic anhydrides, e.g., chlormaleic, and itaconic, in a Diels-Alder reaction with at least one conjugated diene, e.g. 1,3-cyclopentadiene, 1,3-butadiene. Such anhydrides from which the imides corresponding thereto are readily formed, are described in U.S. Pat. 3,271,476, wherein 1:5-bis(cyclopentadienyl) pentane is reacted with maleic anhydride.

Still another class of imides are those derived from the polymerisation of unsaturated cyclic or linear anhydrides with monomers which contain at least one polymerizable double bond. Such monomers can be polymerized through their double bonds in known manners, with known catalysts. Suitable comonomers for copolymerization with these anhydride monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

It is seen that the imide can be reacted with the polymerizable double bond monomer to form the high molecular weight polyfunctional imides, directly, or the anhydride from which the imide will be prepared can be reacted with the unsaturated compound, first, followed by the conversion to the imide form by known techniques.

Another class of imides utilizable herein are those prepared from the reaction of two moles of a diimide and one mole of a dihalide of a dicarboxylic acid. The preparation of such products is set forth in U.S. Pat. 3,346,665 issued to Schwarzer, said patent ebing incorporated herein by reference.

While any mono or polyfunctional imide compound can be utilized in this invention, particularly good results have been obtained when the imide compound utilized has been pyromellitic diimide, cyclopentane diimide, benzophenone tetracarboxylic diimide, and tetrahydrophthalimide.

The volatile solvent used to coordinate the catalyst must be nonreactive with the components of the system.

In light of the present disclosure, those skilled in the art will be able to select an appropriate non-reactive solvent for catalyst coordination for any given system from among those previously mentioned, as well as those others known to fulfill the necessary requirements to be utilized herein.

It is to be seen that the two components can be mixed and stored together in the absence of the catalyst at temperatures up to about 135° F. and that little or no reaction will take place. If deactivated catalyst is present in the mixture, reaction will take place to the extent that the catalyst becomes active and at which temperaure the deactivating solvent begins to vaporize off or else be removed by other means, e.g. application of heat. This exact temperature is dependent on the nature of the solvent.

The relative amount of each reactant to be used depends to some extent upon the functionality of both as well as the precise properties desired in the final product. For tough, hard final cured products, at least part of the oxirane compound content and/or the imide compound content should have a functionality greater than two. However, since both components are well-known to those skilled in the art, the selection of these proportions does not form a part of the present invention. The proportions may be readily selected based as desired, that is stoichiometric or on a stated excess of imide or oxirane.

It should also be noted that one or more than one compound of each class of epoxides may be reacted with one or more than one imide. Thus a monomeric monofunctional oxirane could be used in conjunction with a polyfunctional polymeric epoxide, for example in this reaction. Similarly mono and diimides can be utilized together.

It is also contemplated by this invention to prepare prepolymers, or partial polyomerizates, wherein the reaction is allowed to proceed, partially and is then stopped by the quenching of the catalytic capability of the chromium carboxylate, by addition of deactivating solvent.

Furthermore, the curable mixtures of the invention may be mixed at any stage prior to the completion of the degree of reaction possible as limited by the amount of one of the reactants, with fillers, plasticizers, pigments, dyestuffs, flame-inhibitors, mould lubricants or the like. Suitable extenders and fillers are, for example, asphalt, bitumen, glass fibers, mica, quartz meal, cellulose, kaolin, ground dolomite, colloidal silica having a large specific surface (Aerosil) or metal powders, such as aluminum powder.

The curable mixtures may be used in the unfilled or filled state, if desired in the form of solutions or emulsions, as laminating resins, paints, lacquers, dipping resins, moulding compositions, coating compositions, pore fillers, floor coverings, potting and insulating compounds for the electrical industry, adhesives and the like, and also in the manufacture of such products.

The following examples are presented solely to illustrate the invention and accordingly should not be regarded as limiting in any way. In the examples, the parts and percentages are by weight unless otherwise indicated.

EXAMPLE I

The chromium catalyst was prepared as follows. Inactive chrominum III 2-ethylhexanoate, trihydrate was dissolved in the parent acid (2-ethylhexanoic in this case) and then this solution was heated to 180° C. for two hours. The solution changed from a blue-violet color to an emerald green color. The excess 2-ethylhexanoic acid was then removed under vacuum to yield the active catalyst containing unoccupied coordination sites, namely chromium III tri-2-ethylhexanoate.

Alternatively, the same effect can be produced in an inert solvent whose boiling point is greater than 180° C. by adding some of the parent acid to this solution. However, the time to form unoccupied coordination sites is lengthened since the rate is dependent to some extent on the acid concentration.

EXAMPLE II

Bis-4,4'-diepoxydiphenylether (32.5 gm., 0.25 eq.) was mixed at room temperature with 27 grams (0.25 eq.) of pyromellitic diimide and 0.3 grams of active chromium tri-2-ethylhexanoate in 150 ml. of dimethylformamide. A visual inspection was made of the viscosity and noted. The mixture was then stored for about six months in a closed vessel and then observed. Little change if any was noted in the viscosity. Removal of the solvent at this time as by evaporation or volatilization would result in gelation of the mixture, indicating reaction.

EXAMPLE III

Equal equivalent amounts of 1,2-butylene oxide and succinimide were placed in an excess amount of acetonitrile with 0.25% level of the catalyst of Example I present, it was found the reaction was complete after about 48 hours. Although acetonitrile is a highly polar solvent, its ability to solvate cations, i.e., donate electrons is very poor, and as a consequence it has no tendency to retard the catalytic activity of the activated chromium catalyst.

EXAMPLE IV

A solution was prepared in 100 ml. of dimethylacetamide of 0.2 grams of the catalyst of Example I and 0.3 equivalents of cyclopentane 1,2,3,4-tetracarboxylicdiimide and an oxirane compound of the formula:

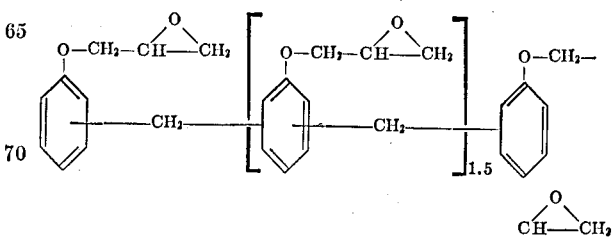

Two exactly the same samples were made, from the first, sufficient amount of solution was poured into a 1.5-in. dia. aluminum moisture dish to form a layer approximately 0.2 in. thick. Most of the solvent was carefully removed by evaporation at 100° C. and the now flexible polymer was removed from the dish. Two minibone specimens were pressed from this polymer which were then placed in a 100° C. oven to remove any last traces of solvent (~4 hrs).

The bars were then flattened between two Teflon-coated steel plates and steadily elevated in temperature to 200° C. where they were held for two hours. The bars were cooled to room temperature, removed from the steel plates and tested for mechanical properties. The results are presented below; averaged for the two specimens:

Initial Properties at 77° F.

| | |
|---|---|
| Tensile, p.s.i. | 13,446 |
| Elongation, percent | 4.8 |
| Modulus, p.s.i. | 293,170 |

The second sample of the solution was stored for 1 month at room temperature. Samples were prepared according to the procedure described above and tested for mechanical properties. The average properties for the two minibone specimens are:

Properties at 77° F. After 1 Mo.
Room Temperature Storage of Solution

| | |
|---|---|
| Tensile, p.s.i. | 13,540 |
| Elongation, percent | 4.3 |
| Modulus, p.s.i. | 314,983 |

EXAMPLE V

Active trivalent chromium trioleate is prepared by reacting chromic nitrate with sodium oleate to form the hydrated trioleate, followed by the heating of same in the presence of oleic acid to remove the water of hydration.

Activated chromic tribenzoate is prepared in like manner by the substitution of benzoic acid for the oleic acid, and sodium benzoate for sodium oletic.

These and all the other active forms of the chromic tricarboxylates are air stable and will not recombine with atmospheric water to form the coordinated or inactive form of the compound.

EXAMPLE VI

In order to illustrate the storeability of the imide-oxirane systems at various temperatures in the presence of active or catalytic form of a chromium$^{+++}$ tricarboxylate, five day storage tests were conducted with measurements of properties being made at one day intervals wherein the solvent systems utilized were both the deactivating and the non-deactivating of the catalytic capability of the non-hydrate chromium III carboxylates.

(a) When equi-equivalent portions of cyclopentane, 1,2,3,4, tetracarboxylic diimide, (CPDI) and the compound 1(2,3 - epoxypropyleneoxy) - 2,6 - di - (1,2-epoxypropyl) benzene, sold by Shell under the tradename EPON X–801, and 0.5% active chromium carboxylate in both toluene and xylene at solvent to resin ratios of 2/1 there was rapid gelation, at 77° F.

(b) When a different oxirane was utilized at a slightly higher catalyst content, the results were similar, at room temperature.

(c) When cyclopentane 1,2,3,4-tetracarboxylicdiimide was mixed with an oxirane compound and a catalytic amout of the active form of a chromium$^{+++}$ tricarboxylate in dimethylacetamide, the solution after thorough mixing was divided into three portions. One each was stored for 5 days at 35° F., 77° F. and 135° F. The viscosity of the samples stored at 35° and 77° was unchanged after five days. The third sample showed a slight increase in viscosity, as measured by an increased time for a bubble to rise through a two inch column height of the sample when placed in a vial. At the end of the first day, no time differential was observed, but at the end of the five day period, the time required for the bubble rise was three seconds.

(d) Three more samples of the composition of Example VI(c) were evaporated following preparation and cure, and tensile bars were formed out of the solidified polymerizate. A second set of three samples of this same composition were each evaporated after five days of storage at the respective 35, 77 and 135 degree temperatures. Tensile bars were again prepared following the cure of the composition, i.e., completion of the polymerization. In each instance there was shown to be no deterioration of mechanical properties.

(e) When a known imide-oxirane component system is prepared with a catalytic amount of an active chromium$^{+++}$ tricarboxylate in a deactivating solvent such as DMF, or methyl sulfolane give pot lives of extended duration up to about six months. Shorter but usable pot lives can be obtained when dioxane, tetramethylguanidine and nitrobenzene are used as the electron donating solvent. This fact has importance in the preparation of paints and other coating compositions.

The following is a description of what transpires upon removal of the solvent which deactivates the catalyst's capability and the conditions required for subsequent polymerization of the resulting catalyzed imide-oxirane component system.

Solvent removal can be effected by using a warm (110° F.) air sweep for a period of several minutes to several hours. The time required is related to the surface area and the volume of the composition. As the deactivating solvent is removed catalytic activity is slowly restored and the polymerization reaction begins. Depending on the reaction components employed, either a low melting solid or viscous liquid remains after solvent removal. If the residue is liquid, polymerization will take place at room temperature until a low melting point solid material is formed. At this point the mobility of the remaining reactive end groups virtually ceases resulting in a substantial cessation of the polymerization mechanism.

If a rigid solid residue remains after solvent removal, no further polymerization transpires at room temperature. If rubbery, reaction continues to the rigid state.

To prepare a finally cured or hardened product, the application of heat is necessary. The temperature to which the rigid partially cured solid is to be subjected to, in order to obtain total curing, is that temperature which equals or exceeds the heat distortion temperature of the totally cured system, which can vary from room temperature to several hundred degrees centigrade.

EXAMPLE VII

A six-ply laminate was prepared by solution coating from DMF, a glass fabric, using activated chromium tricarboxylate containing a stoichiometric amount of each of pyromellitic diimide and diphenylether diepoxide. This coated glass was dried in a warm air circulating oven for about ten hours. The laminate was press cured at 100 p.s.i. at over 500° F. for about six hours, to form a composite.

Based on the modulus measurements taken at various temperatures, it would appear that the heat distortion temperature is above 600° F. (315° C.). This heat distortion temperature compares favorably with those achieved for commercial polymeric polyimides, which are formed by condensation reactions with all of their attendant difficulties.

Typical polymerizates prepared according to the process of the present invention, are seen to possess tensile strengths on the order of 5000 to 13,000 p.s.i. and elongations of from about one to seven percent, and moduli of from about 50,000 to 250,000 p.s.i.

EXAMPLE VIII

In order to demonstrate the adhesive capability of compositions prepared according to this invention, a typical one was utilized in the preparation of lap shear specimens wherein two steel plates are overlapped one inch and cemented or bonded together. The yield strength of the bond at room temperature was found to be approximately 5000 p.s.i., after the composition had been cured for two hours at about 200° centigrade.

EXAMPLE IX

In order to illustrate the point that the inventive aspect of this application lies in the use of certain solvents to retard the polymerization or reaction of imides with oxiranes, and that the polymerization can be initiated as desired, it is seen that when stated portions of both oxirane and imide are mixed under varying conditions that the following will be the results:

(a) Reactants+active form of a chromium carboxylate in xylene=rapid reaction and gel formation of desired product.

(b) Reactants+inactive form or hydrated form of a chromium carboxylate in xylene=formation of homopolymer of oxirane+small amount of desired product.

(c) Reactants+inactive form of a chromium carboxylate in dimethyl formamide, a deactivating solvent for the activated catalyst form=formation of homopolymer of oxirane+small amount of desired product.

(d) Same as (c) but then volatilize the solvent, dimethyl formide, and no effect is made on rate or reaction products.

(e) Reactants+active form of chromium carboxylate in dimethyl formamide=no reaction.

(f) Same as (e) but then volatilize the dimethyl formamide=only desired reaction product. No homopolymer of oxirane is formed.

(g) Reactants+xylene, but no chromium compound= essentially no reaction of any nature below about 100° C.

(h) Same as (g), but solvent is any of the aforementioned electron donating solvents.

(i) Reactants+inorganic chromic salts in dimethyl formamide=no reaction at normal operating temperatures due primarily to lack of solubility of such salts in organic solvents.

EXAMPLE X

To illustrate the fact the oxiranes and primary imides can be used compatably in combinations of more than one of each component, 10.8 grams of pyromellitic diimide, 10.4 grams of cyclopentane 1,2,3,4, tetracarboxylic diimide, 17.5 grams of the condensate of epichlorohydrin and Bis-Phenol A and 11.0 grams of 1,(2,3 epoxy propyleneoxy) -2,6-Di(1,2-epoxy propyl) benzene, Shell Epon X–801, were mixed together in 100 ml. of DMF solvent which contained a catalytic amount of a chromium III tricarboxylate salt. The total mixture was found to be storage stable, and no reaction is anticipated until the solvent is removed.

It is readily understood that 1 or more of the activated chromium III tricarboxylate salts, also written as, chromium+++ tricarboxylate salts having unoccupied coordination sites, may be used in conjunction with each other in a polymerization system.

EXAMPLE XI

In order to illustrate the fact that prepolymers can be prepared and that such are storeable and further that such partially reacted imide-oxirane reaction products can be further reacted at will by the removal of the catalyst deactivating solvent, two similar compositions were prepared with the exception of the solvent system. In solution #1, acetone was used. In solution #2 methanol was used. Both solutions contained identical amounts of the stiochiometric mixture of tetrahydrophthalimide and diglycidyl ether of Bisphenol A, and the same amount of the same activated chromium catalyst. In both instances sufficient solvent was added to bring the total volume to 100 ml.

|  | $T_0$ | $T_1$ | $T_2$ | $T_3$ |
|---|---|---|---|---|
| SOLUTION #1 | | →| | |
| SOLUTION #2 | | | → | |

→Indicates reaction taking place

Time intervals:

$T_0$=starting time
$T_1$=16 hours from $T_0$
$T_2$=16 hours from $T_1$
$T_3$=13 hours from $T_2$ At $T_0$ acetone containing the catalyst, had mixed therein the oxirane and imide constituting solution #1.

At $T_0$ methanol containing the catalyst had mixed therein the oxirane and imide constituting solution #2.

At $T_1$ measurement was made of the percent of reaction for both.

Solution #1 reacted 19.5%
Solution #2 reacted 0.0%

Further at this time point, methanol was removed from solution #2 and replaced with a like volume of acetone. Solution #1 was not changed.

At $T_2$ measurement was made of the percent of reaction for both.

Solution #1 reacted 10.9%
Solution #2 reacted 18%

Further at this time point, acetone was removed from solution #2 and replaced with a like volume of methanol. Solution #1 was not changed.

At $T_3$ measurement was made of the percent of reaction for both.

Solution #1 reacted 6.1%
Solution #2 reacted 0.0%

The above procedure is seen to illustrate the fact that the reaction between the oxirane and imide can be deferred until such time as it is desired that the reaction take place. The procedure further illustrates the fact that the reaction can be controlled almost at will, by quenching the catalytic activity of the active form of the catalyst. It is seen that for solution #2 that the amount of reaction the time interval $T_1$ to $T_2$ is substantially the same as the extent of the reaction for solution #1 for $T_0$ to $T_1$.

In the above procedure, the total percent of reaction for solution #1 is 36.5%, and solution #2 only 18.0%. The reaction rate was followed titrimetrically using a recording titrimeter of conventional manufacture.

Compositions prepared according to the present invention appear to have excellent resistance to high temperature (260° F.) and high hydrochloric acid environment. These compositions are relatively low in cost, possess excellent adhesive properties to many materials and good abrasion resistance. The compositions are useful as protective coatings for metal surfaces, and as adhesives for such as well. They possess commercial acceptability for these purposes, since the two components and the deactivated catalyst can be put into the same container without the fear of set up if the precaution is taken as discussed in detail above, to maintain the deactivation of the catalyst until utilized.

When stainless steel sheets are coated with a typical oxirane-imide composition in an electron donating solvent which contains an active form of a chromic carboxylate and a pigment, it is found that as the solvent evaporates, thus activating the active form of the catalyst, that a hard smooth coating will form which is adhered to the steel.

Since certain changes may be made in the above compositions and processes without departing from the scope of the invention herein involved, it is intended that all matter contained in the above description shall be interpreted as illustrative and not in a limiting sense.

What is claimed is:

1. A method of prolonging the pot life of a composition comprising at least one organic compound, containing at least one oxirane moiety, and at least one organic compound containing at least one primary imido group, and a catalytic amount of a trivalent chromium III tricarboxylate salt catalyst which has unoccupied coordination sites, comprising dissolving the oxirane and imide compounds and the catalyst in a non-reactive volatile electron donating solvent, and maintaining the mixture at a temperature below the volatilization temperature of the solvent.

2. A process for preparing a resinous composition which comprises mixing together in a solvent system containing a non-reactive volatile electron donating solvent, at least one organic compound containing at least one primary imido group, at least one organic compound containing at least one oxirane moiety, and a catalytic amount of an activated chromium III tricarboxylate salt; heating the mixture to remove the solvent to bring about a reaction between the imides and oxiranes and to cure the resulting polymerizate.

3. The process of claim 2 wherein the heating is done incrementally.

4. The process of controlling the polymerization of oxiranes with imides in the presence of a catalytic amount of a chromium III tricarboxylate salt having unoccupied coordination sites, which comprises; using as the solvent for the polymerization a system containing a non-reactive volatile electron donating solvent, removing at least a portion of the electron donating solvent to permit polymerization to commence, and adding additional electron donating solvent to inhibit polymerization, repetitively adding and repetitively removing sequentially as desired, until the desired amount of polymerization has taken place.

5. A liquid coating composition comprising as the essential organic film-forming components thereof a mixture of at least one organic compound containing at least one primary imido group, at least one organic compound containing at least one oxirane moiety, a solvent system containing a non-reactive electron donating removable solvent, and a catalytic amount of a chromium III tricarboxylate salt having unoccupied coordination sites.

6. A package-stable, heat curable, resin forming composition comprising at least one organic compound containing at least one primary imido group, at least one organic compound containing at least one oxirane moiety, and a catalytic amount of an electron donating solvent deactivated chromium III tricarboxylate salt.

7. A storeable polymerizable composition comprising at least one organic compound containing at least one primary imido group, at least one organic compound containing at least one oxirane moiety, at least one non-reactive electron donating volatilizeable solvent, and a catalytic amount of at least one chromium III tricarboxylate salt having unoccupied coordination sites.

8. A novel storable epoxy resin system comprising at least one curable oxirane and at least one primary imide the improvement wherein the system is provided with a catalytic amount of a trivalent chromium III tricarboxylate salt catalyst having unoccupied coordination sites deactivated with a non-reactive volatile electron donating solvent, which solvent is adapted to evaporate upon application of the composition to a surface, thereby reactivating the catalyst capability for the oxirane-imide reaction.

References Cited
UNITED STATES PATENTS 3,635,869 1/1972 Steele et al. _____ 260—30.4 Ep
3,346,665 10/1967 Schwarzer _____ 260—47

WILLIAM H. SHORT, Primary Examiner

T. PERTILLA, Assistant Examiner

U.S. Cl. X.R.

260—2 N, 2 BP, 9, 18 PF, 28, 29.2 Ep, 30.2, 30.4 Ep, 30.8 R, 32.4, 32.6 R, 33.4 Ep, 37 Ep, 47 EN, 59, 67.5, 78 R, 78.4 Ep, 88.3 A, 830